(No Model.) 3 Sheets—Sheet 1.

C. HEECKSTADT & A. MOE.
DINNER PAIL.

No. 428,097. Patented May 20, 1890.

Witnesses

Inventor
Chas. Heeckstadt
—and—
Andrew Moe.

By their Attorneys
James J. Sheehy

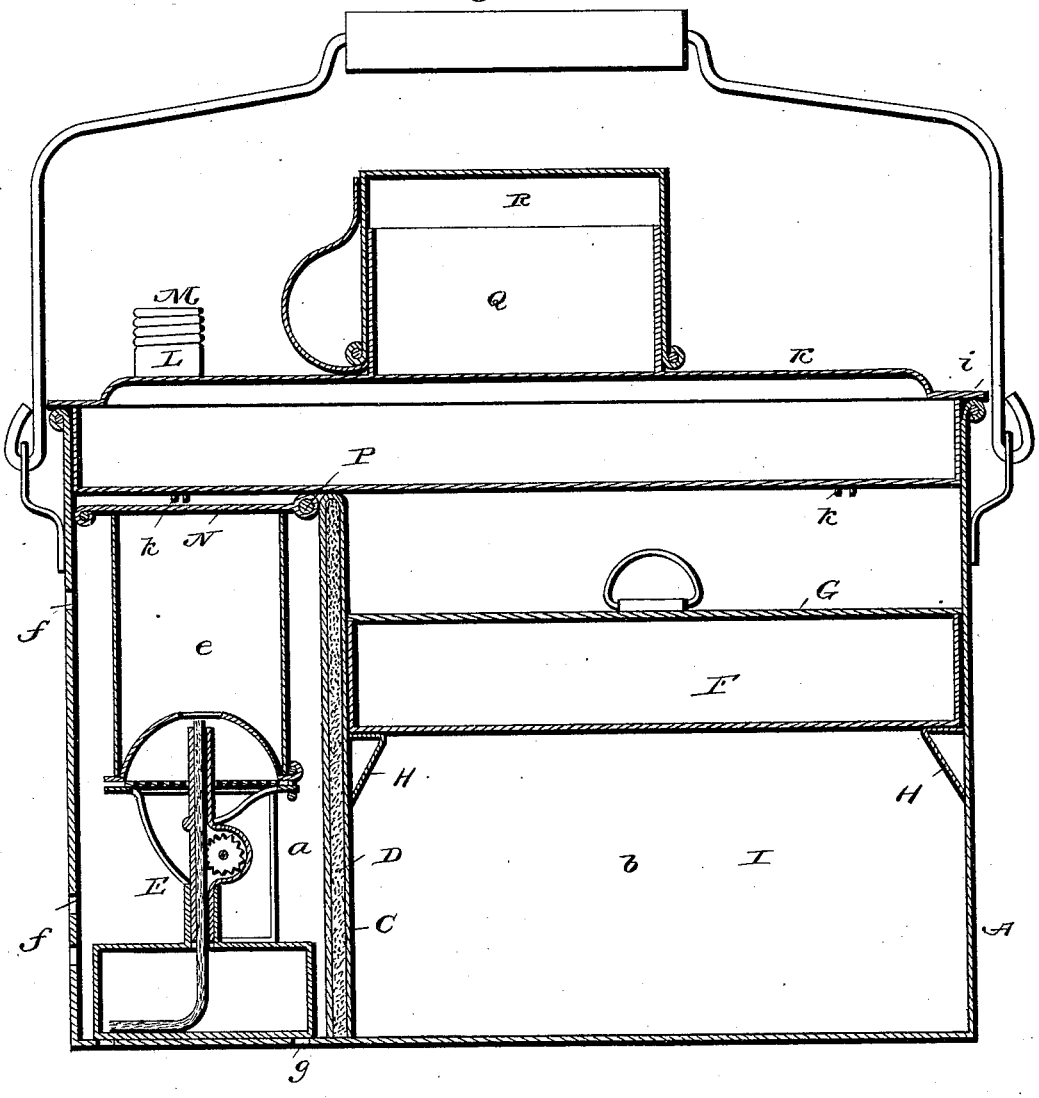

(No Model.) 3 Sheets—Sheet 3.
C. HEECKSTADT & A. MOE.
DINNER PAIL.
No. 428,097. Patented May 20, 1890.
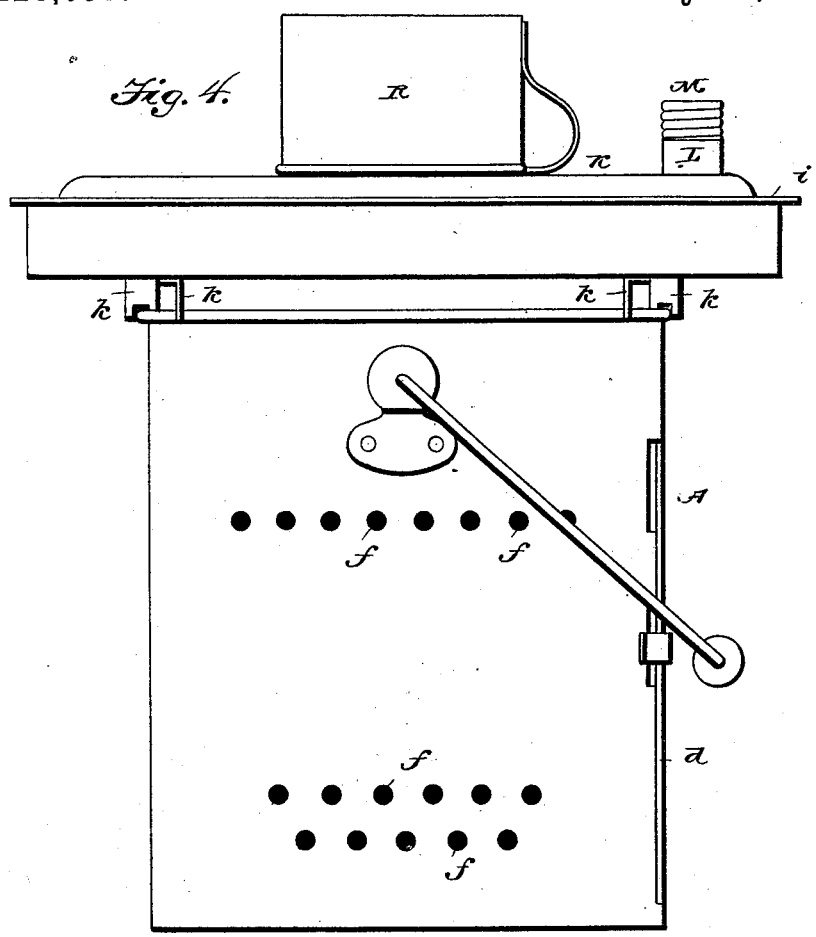
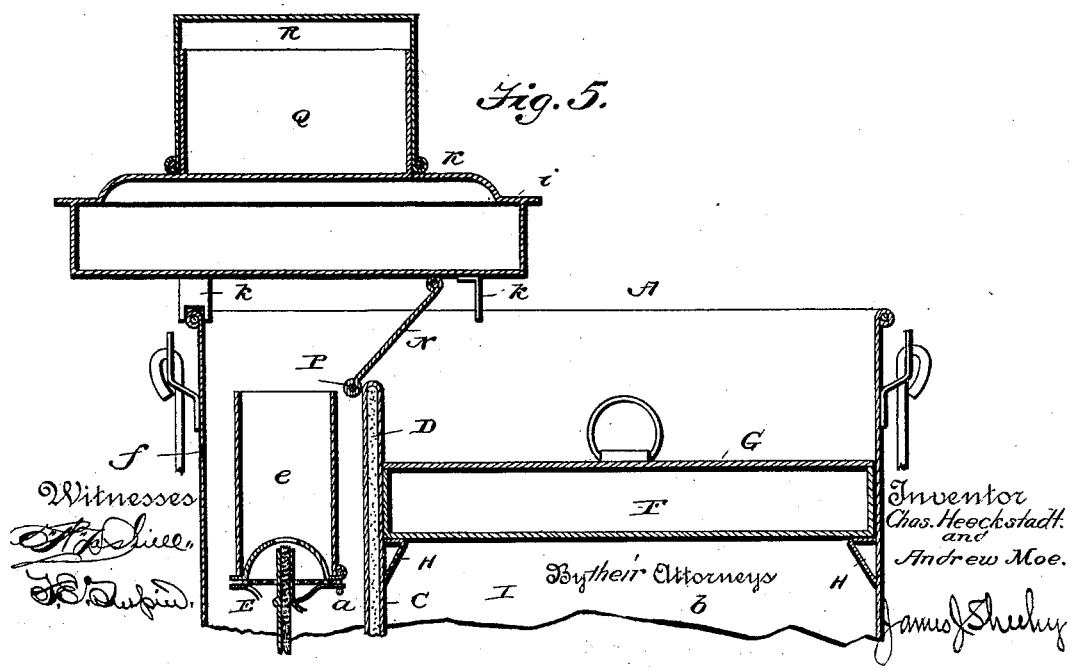

UNITED STATES PATENT OFFICE.

CHARLES HEECKSTADT AND ANDREW MOE, OF EAU CLAIRE, WISCONSIN.

DINNER-PAIL.

SPECIFICATION forming part of Letters Patent No. 428,097, dated May 20, 1890.

Application filed May 7, 1889. Serial No. 309,853. (No model.)

*To all whom it may concern:*

Be it known that we, CHARLES HEECKSTADT and ANDREW MOE, citizens of the United States, residing at Eau Claire, in the county of Eau Claire and State of Wisconsin, have invented certain new and useful Improvements in Dinner-Pails; and we do declare the following to be a full, clear, and exact description of the invention, such as will enable others skilled in the art to which it appertains to make and use the same.

This invention has relation to improvements in dinner-pails; and the novelty will be fully understood from the following description and claims, when taken in connection with the annexed drawings, in which—

Figure 1:
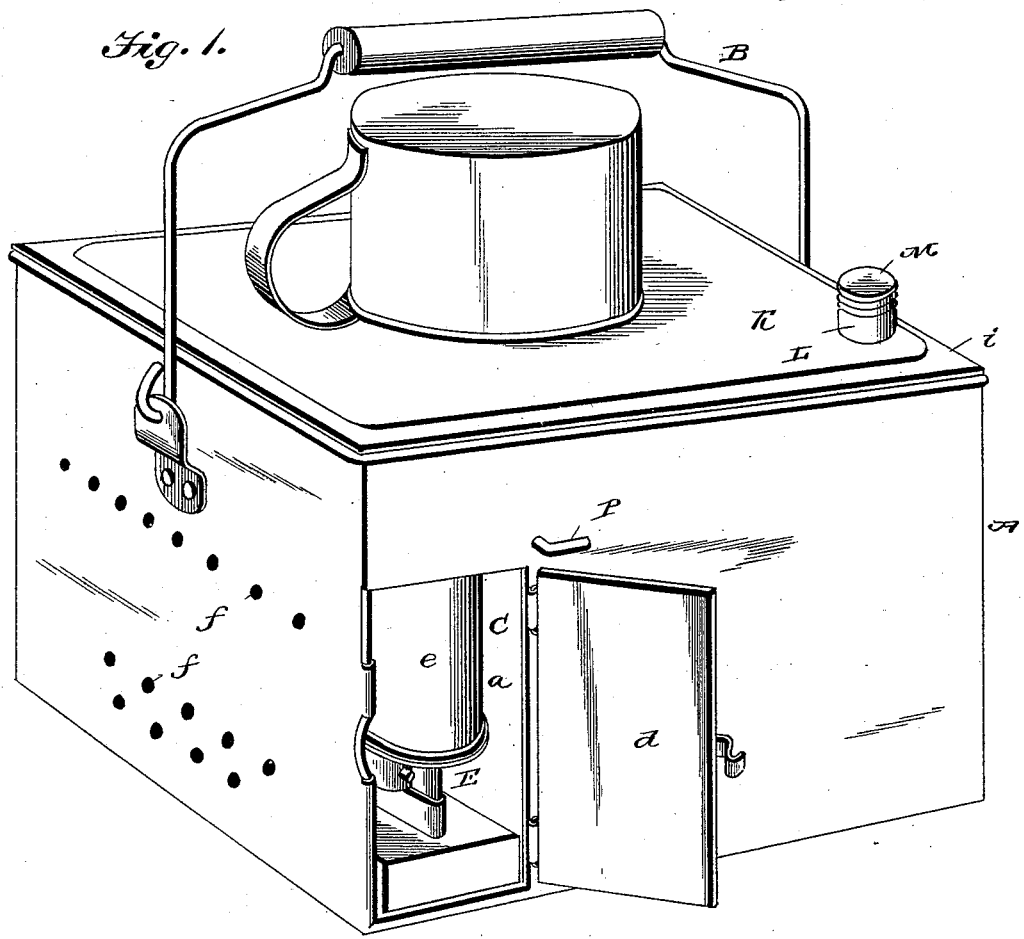
Figure 2:
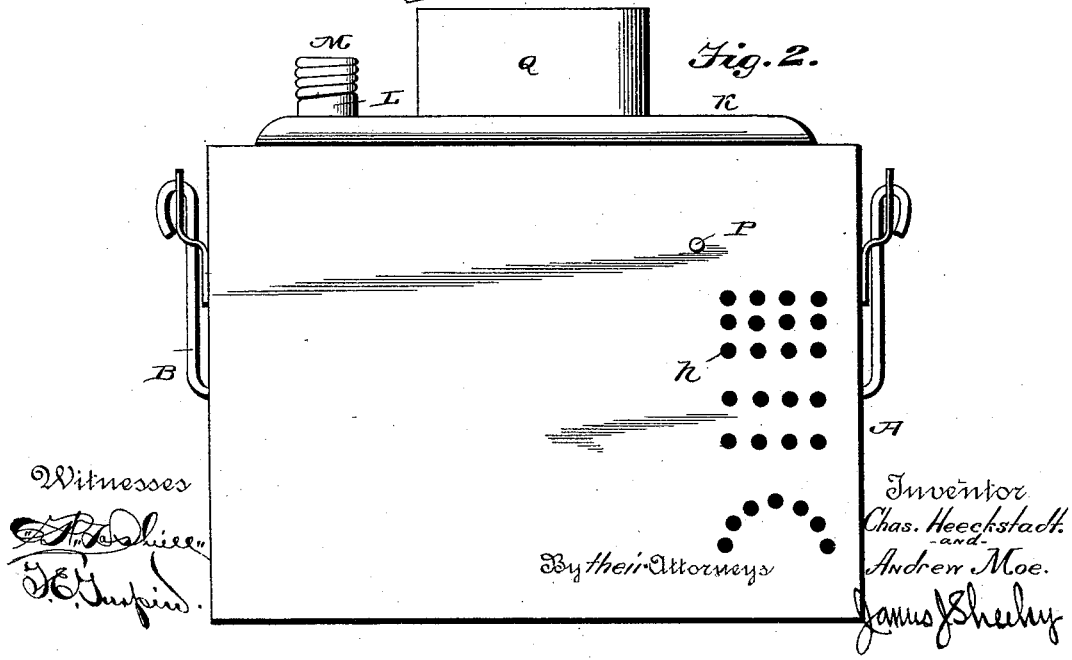

Figure 1 is a perspective view of our improved pail with the door of the lamp-chamber thrown open to show the lamp therein. Fig. 2 is a side elevation. Fig. 3 is a vertical longitudinal sectional view. Fig. 4 is an end elevation showing the hollow cover or coffee-holder in a position above the lamp to warm its contents, and Fig. 5 is a longitudinal sectional view of the upper part of Fig. 4.

Referring by letter to the said drawings, A indicates a dinner or lunch pail, which may be formed from tin or other suitable material, and preferably in a rectangular form. This pail is provided with a pivoted handle, as shown at B, and the body is divided into a lamp-compartment $a$ and a compartment $b$ for victuals, being divided by a vertical partition C. This partition extends a sufficient height from the bottom of the pail, and is formed with a double wall having a filling D of asbestus. The lamp-chamber $a$ is provided with a suitable door $b$ for the introduction and removal of the lamp E. The lamp may have a metallic shade $e$, and may be of any suitable pattern, such as employed in this class of pails. This lamp-compartment has three of its walls perforated, as shown at $f$, $g$, and $h$, so as to afford sufficient draft for combustion.

F indicates a plate, which is provided with a removable cover G, adapted to be supported upon ledges H, formed in the walls of the compartment $b$, a sufficient space I being left beneath this removable pan or plate to receive victuals, which, owing to the use of asbestus or other non-conducting substances in the wall C, enables the victuals in said compartment to be kept cool.

K indicates the cover for the pail. This cover is made hollow and is adapted to serve as a receptacle for coffee or tea, having an outlet and filling aperture L, which is normally covered by a screw-cap M. This hollow cover has a marginal flange $i$, which is adapted to rest upon the upper wired edge of the pail-body, and is provided on its under side with lugs or short legs $k$, to support the same upon the edge of the pail and above the lamp, as will be presently described. It will be observed that these legs $k$ are notched, so as to straddle the upper edges of the pail, and the said legs are so arranged that two of them will straddle the edge of the end wall, while the other two will straddle the edge of the side walls above the lamp-chamber, so that the coffee or contents of the hollow cover may be heated.

N indicates a valve or deflector. This deflector-plate N is hinged in the side walls of the lamp-chamber and adjacent to the partition-wall C, so that it may turn partly over the said wall and its upper edge bear against the under side of the hollow cover when its contents is being heated.

P indicates a rod, which serves as a pintle for the plate N and extends at one side of the pail, so as to form a handle, as better shown in Fig. 1, whereby said plate may be turned in the desired position. This plate, as well as serving to deflect the flame and confine it beneath the hollow cover, is also adapted to be turned over upon the top of the lamp-chamber when the lamp is not in use and materially serve in keeping smoke and other impurities from the victuals - chamber. The cover is also provided on its upper side with an annular vertical flange Q, which may form a receptacle for salt or the like, and a cup R is designed to form a cover for this salt-receptacle.

In operation it will be seen that to heat the coffee the hollow cover is removed from the pail and the said cover placed in a transverse position above the lamp-chamber. The legs, straddling the upper edge of the pail, will serve to steady the same and hold it firmly while being heated, the hinged plate N serving to prevent the flame from entering the victuals-chamber. These legs may also serve as a useful means of preventing the cover from coming in contact with anything it may be placed upon while in use.

Having described our invention, what we claim is—

1. A dinner-pail having a lamp-chamber and a victuals-chamber, respectively, in combination with a cover hinged to the partition-wall of said chambers, and a hollow removable cover for the pail having legs to engage the upper edge of the pail above the lamp-chamber, the said hinged cover serving when turned down as a cover for the lamp-chamber and when turned up as a shield, substantially as specified.

2. The combination, with the dinner-pail having a lamp-chamber, of the lamp arranged therein, and the cover having notched supports $k$, arranged on the bottom thereof and at right angles to each other, so as to engage the upper edge of the pail and be sustained transversely thereon, whereby access may be had to the victuals-compartment while the potable liquid is being heated, substantially as specified.

In testimony whereof we affix our signatures in presence of two witnesses.

CHARLES HEECKSTADT.
ANDREW MOE.

Witnesses:
R. K. BOYD,
THOS. MCDERMOTT.